(12) United States Patent
Eyer et al.

(10) Patent No.: US 8,817,072 B2
(45) Date of Patent: Aug. 26, 2014

(54) DISPARITY DATA TRANSPORT AND SIGNALING

(75) Inventors: Mark Kenneth Eyer, Woodinville, WA (US); Ikuo Tsukagoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 592 days.

(21) Appl. No.: 13/022,817

(22) Filed: Feb. 8, 2011

(65) Prior Publication Data

US 2011/0221862 A1    Sep. 15, 2011

Related U.S. Application Data

(60) Provisional application No. 61/313,612, filed on Mar. 12, 2010, provisional application No. 61/316,733, filed on Mar. 23, 2010, provisional application No. 61/346,652, filed on May 20, 2010, provisional application No. 61/378,792, filed on Aug. 31, 2010, provisional application No. 61/415,457, filed on Nov. 19, 2010, provisional application No. 61/415,924, filed on Nov. 22, 2010.

(51) Int. Cl.
*H04N 13/00* (2006.01)
*H04N 7/32* (2006.01)

(52) U.S. Cl.
CPC ..... *H04N 13/0055* (2013.01); *H04N 19/00769* (2013.01)
USPC .......................................................... 348/43

(58) Field of Classification Search
CPC ............................ H04N 13/00; H04N 13/0055
USPC .......................................................... 348/43
See application file for complete search history.

(56) References Cited

U.S. PATENT DOCUMENTS 5,818,439 A * 10/1998 Nagasaka et al. ............... 725/87
6,043,838 A *  3/2000 Chen ............................... 348/42

(Continued)

FOREIGN PATENT DOCUMENTS

| CN | 101653011 | 2/2010 |
|---|---|---|
| WO | WO 2009/029278 | 3/2009 |

(Continued)

OTHER PUBLICATIONS

Office Action issued Apr. 2, 2014, in Chinese Patent Application No. 201180012449.4 (with English-language Translation).

(Continued)

*Primary Examiner* — Y Lee
*Assistant Examiner* — Irfan Habib
(74) *Attorney, Agent, or Firm* — Oblon, Spivak, McClelland, Maier & Neustadt, L.L.P.

(57) ABSTRACT

A method of decoding closed caption disparity data, involves a TV receiver receiving closed caption disparity data for a 3D display encoded as a sequence of frame interval/slope change pairs, with the frame interval representing a designated number of frames over which each linear function representing disparity is to be applied paired with a value indicating a change in slope from the slope of a preceding segment. A first segment in the sequence presumes a predetermined slope as a reference. A sequence of caption data packets specifies a closed caption display window containing closed caption text. The disparity value is used in each frame to determine a horizontal offset of left and right eye views of the CC display that establishes the closed caption display window's perceived z-axis position. This abstract is not to be considered limiting, since other embodiments may deviate from the features described in this abstract.

24 Claims, 8 Drawing Sheets

(56) References Cited

U.S. PATENT DOCUMENTS

| | | | |
|---|---|---|---|
| 6,252,596 B1* | 6/2001 | Garland | 715/810 |
| 7,035,292 B1* | 4/2006 | Giorgetta et al. | 370/509 |
| 7,312,891 B2 | 12/2007 | Tsuchiya et al. | |
| 7,463,257 B2* | 12/2008 | Martin | 345/419 |
| 8,421,914 B2* | 4/2013 | Hirasawa et al. | 348/425.1 |
| 2001/0019357 A1* | 9/2001 | Ito et al. | 348/152 |
| 2003/0035063 A1 | 2/2003 | Orr | |
| 2003/0053661 A1* | 3/2003 | Magarey | 382/103 |
| 2003/0156188 A1* | 8/2003 | Abrams, Jr. | 348/51 |
| 2004/0010807 A1 | 1/2004 | Urdgang et al. | |
| 2004/0125877 A1* | 7/2004 | Chang et al. | 375/240.28 |
| 2005/0025361 A1* | 2/2005 | Gadre et al. | 382/181 |
| 2005/0060758 A1 | 3/2005 | Park | |
| 2006/0184994 A1 | 8/2006 | Eyer et al. | |
| 2007/0076960 A1* | 4/2007 | Takamori et al. | 382/224 |
| 2007/0296863 A1* | 12/2007 | Hwang et al. | 348/563 |
| 2008/0205851 A1* | 8/2008 | Sakai | 386/95 |
| 2008/0316303 A1* | 12/2008 | Chiu et al. | 348/51 |
| 2009/0015710 A1* | 1/2009 | Hirasawa et al. | 348/425.1 |
| 2009/0059031 A1* | 3/2009 | Miyakoshi | 348/222.1 |
| 2009/0315979 A1 | 12/2009 | Jung et al. | |
| 2010/0021141 A1 | 1/2010 | Yamashita et al. | |
| 2010/0114576 A1* | 5/2010 | Sundararajan | 704/253 |
| 2010/0157025 A1* | 6/2010 | Suh et al. | 348/51 |
| 2010/0171812 A1* | 7/2010 | Kim et al. | 348/43 |
| 2010/0295970 A1* | 11/2010 | Suzuki | 348/240.3 |
| 2010/0303158 A1* | 12/2010 | Lin | 375/240.26 |
| 2011/0063414 A1* | 3/2011 | Chen et al. | 348/43 |
| 2011/0081133 A1* | 4/2011 | Chen et al. | 386/356 |

FOREIGN PATENT DOCUMENTS

| | | |
|---|---|---|
| WO | WO 2009/139740 | 11/2009 |
| WO | WO 2010/010499 | 1/2010 |

OTHER PUBLICATIONS

Extended European Search Report issued May 27, 2014, in Patent Application No. 11753792.8.

* cited by examiner

DISPARITY DATA TRANSPORT AND SIGNALING

CROSS REFERENCE TO RELATED DOCUMENTS

This application claims priority benefit of U.S. Provisional Patent Application No. 61/415,924 filed Nov. 22, 2010 entitled "Service Linkage to Caption Disparity Data Transport" to Mark Eyer, et al.; and this application claims priority benefit of U.S. Provisional Patent Applications No. 61/415,457 filed Nov. 19, 2010 entitled "Disparity Data Signaling and Transport for 3D Captioning" to Mark Eyer, et al.; 61/346,652 filed May 20, 2010 entitled "Disparity Data Transport" to Mark Eyer, et al.; and 61/313,612 filed Mar. 12, 2010 to Mark Eyer et al, and this application claims priority benefit of U.S. Provisional Patent Application No. 61/316,733 filed Mar. 23, 2010 entitled "Extended Command Stream for CEA-708 Captions" to Mark Eyer et al., and this application claims priority of U.S. Provisional Patent Application No. 61/378,792 filed Aug. 31, 2010 entitled "Efficient Transport of Frame-by-Frame Change in Captioning Disparity Data" to Mark Eyer; each of which is hereby incorporated by reference in their entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Closed Captioning is used in television programming to provide visible text (generally a transcription of speech and sounds) for the television viewer. Closed Captioning (CC) is especially helpful for the hearing impaired. CC data is provided in television programming using techniques defined by various technical standards including various versions and implementations defined in technical standards CEA-608 and CEA-708.

Unfortunately, with the emergence of three dimensional (3D) stereoscopic television (3DTV), conventional techniques do not provide the optimum mechanism for one to view captioning in the 3DTV environment since the captioning may generally appear in an inconvenient z-axis location (depth) relative to other video objects which may appear to be in front of or behind the captions.

BRIEF DESCRIPTION OF THE DRAWINGS

Certain illustrative embodiments illustrating organization and method of operation, together with objects and advantages may be best understood by referencing the detailed description that follows taken in conjunction with the accompanying drawings in which.

DETAILED DESCRIPTION

Figure 1:
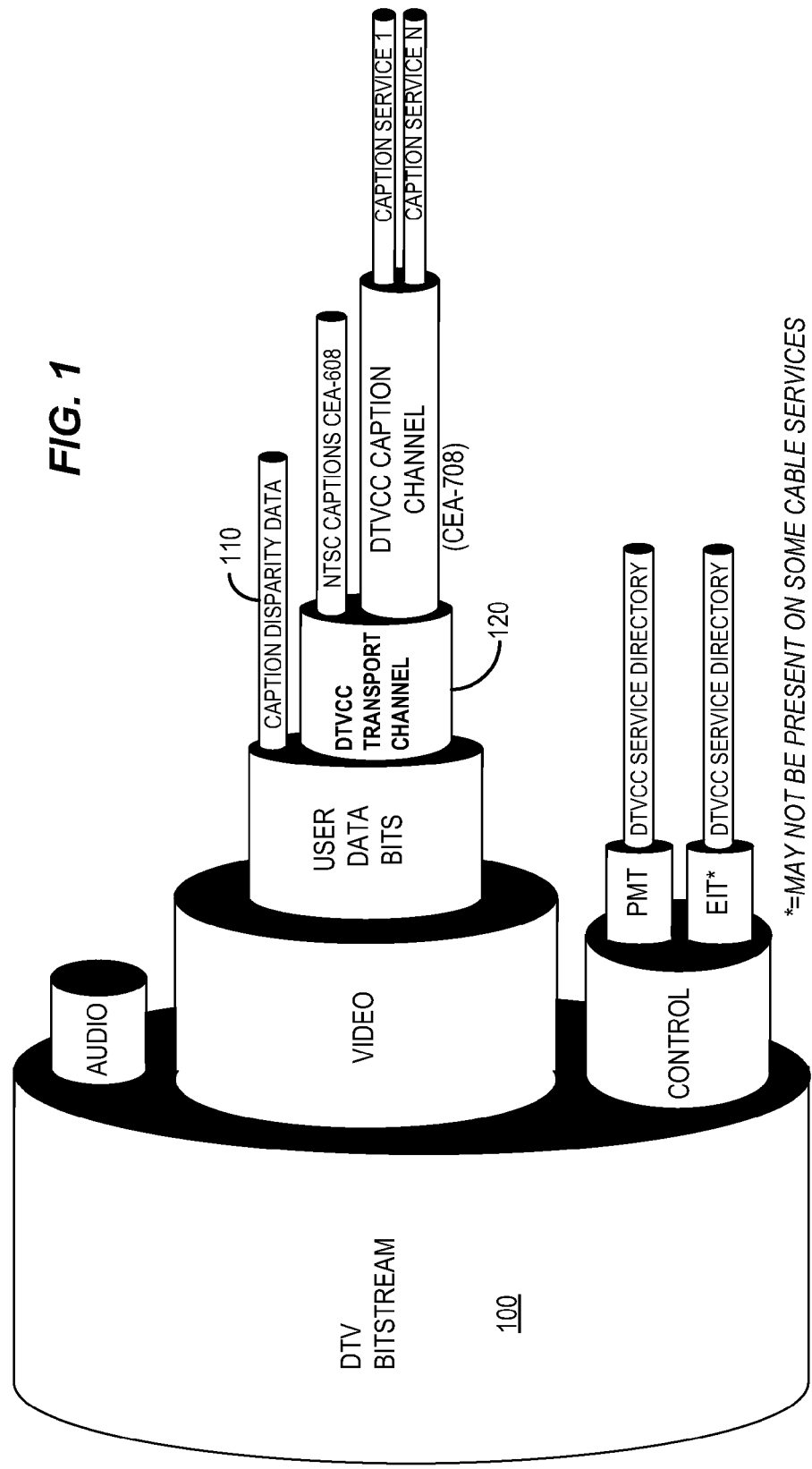
FIG. 1 is a diagram illustrating the transport of caption disparity data consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a program module, a script, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an implementation", "an example" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Implementations consistent with embodiments of the present invention generally relate to the transport and format of data used for the rendering of closed captions over 3D video.

When closed captioning is rendered in the display of a 3D video program, as described above, the CC window and associated text is likely to be rendered in the plane of the screen unless steps are taken to render the window and text such that they appear at a different, more appropriate, perceived depth. An object in a scene within 3D content may be presented such that it appears to the viewer to be some distance in front of the plane of the display screen. If a captioning window positioned in depth at the plane of the display were to be placed in front of that object, a "depth violation" would occur. In such a case, the viewer is presented with conflicting depth cues, a situation that causes eye fatigue and discomfort. Since captioning may intersect in the z-axis with content in the scene if it is simply positioned at the screen plane, the presentation of captioning is preferably individually authored to the subject matter of the video presentation. In order to accomplish this, extra information can be sent along with the captions to define the perceived placement on the z-axis (a designated distance in front or behind the plane of the screen) of a window containing the caption text for effective presentation and to avoid interference with objects in the scene. A number of techniques can be devised to provide this information, but many have disadvantages.

Stereoscopic 3D television involves delivery to the display screen of separate views for the left and right eyes, coupled with a method to allow each of the viewer's eyes to see only the image intended for that eye. The illusion of depth is achieved when, for a given object, the left- and right-eye views differ in the horizontal position of that object's placement. An overview of the basic technology relating to three dimensional display systems is described in "3D Display Systems" by Dr. Nick Holliman, Department of Computer Science, University of Durham, Science Laboratories, South Road, Durham DH1 3LE, UK (see particularly pp. 10-11 and FIG. 5), which is hereby incorporated by reference in the document's entirety.

The term "disparity" as used herein can be more formally referred to as "screen disparity" (i.e., as measured on the screen) as distinguished from "retinal disparity" and is defined as the difference of the physical x coordinates of corresponding points in the right and left images in a pair of aligned stereo images displayed on a screen. The less formal term "disparity" will be used herein for simplicity. By convention, when disparity is negative (e.g. when the left-eye image is rendered on the screen to the right of the right-eye image), the object is perceived as being in front of the plane of the screen. When disparity is positive (e.g. when the left-eye image is rendered on-screen to the left of the right-eye image), the object is perceived as being behind the screen plane.

The term "disparity data" can refer to any data indicating the disparity value to be used in rendering a given graphical object, such as a caption window and its associated text. The term can also be used more generally to refer to data reflecting the z-axis positions of objects in the current scene. The scene area can be mapped out into regions, with the z-axis position of the object in each region that is closest to the viewer recorded as a coordinate in the map. Such a map may be called a "disparity map" or a "depth map." Disparity maps can change on a frame-by-frame basis and can be represented in any number of ways. It is noted that disparity is a measure of the horizontal offset of left eye and right eye images, but the offset need not be in an integer number of pixels as fractional pixel offsets are perfectly acceptable.

Within the context of delivery of 3D video and CC content for display, disparity is generally represented as a percentage of the width of the accompanying video. As such, it is a dimensionless number. For example, the signaling scheme may specify that one unit of disparity is equal to $1/1920$ of the width of the video content (which is generally rendered to match the width of the display screen). But, a disparity of $1/1920$ is not the minimum increment in actual disparity even with a screen width of 1920. With this definition, a disparity of 7 refers to a distance equal to $7/1920$ of the width of the video content. Again with this definition, in the special case of a screen with 1920 pixels of horizontal resolution, this works out such that one full unit of disparity is the same width as one display pixel, but this should be thought of as a special case. If a display screen has fewer than 1920 horizontal pixels, e.g., 1600 horizontal pixels, then disparity is scaled accordingly and a disparity of 7 equates to $(7/1920)(1600)=5.83$ pixels. Hence, disparity should most properly be viewed as the difference in the physical location on the screen along the x axis (horizontal) of corresponding points in left eye and right eye images in a pair of aligned stereoscopic images. It is also noteworthy that the CC window will generally be a two dimensional window which is positioned along the z-axis and which is perceived to be in a plane parallel to the plane of the display screen.

A proposal has been made to a standards committee for an approach to adding disparity data to set the perceived z-axis, or depth, for specific CEA-708 caption windows using CEA-708-compatible syntax. One approach provides disparity data for any given CEA-708 caption window by using a command extension method in CEA-708 called the ETX1 method. This proposal has drawbacks, but several other possibilities can be devised for transport of the disparity data. In one example, the caption disparity data can be placed into a separate picture user_data( ) packet, thus disconnecting it from the buffering and timing concerns that it would have to face if it were carried inside the caption stream. This is depicted in the diagram shown in FIG. 1.

FIG. 1 represents a DTV bitstream 100 as a "data pipe" carrying data used for transporting the various elements used to convey DTV information to a recipient digital television receiver device (i.e., a TV, a set-top box, etc.) over a physical channel. In one implementation of embodiments consistent with the present invention, caption disparity data can be defined as another type of user_data( ) and is shown in this illustration as caption disparity data 110. This enables the disparity data to be transported outside the DTVCC transport channel 120 per se and enables use of additional bandwidth not allocated to DTVCC caption services per se.

Figure 2:
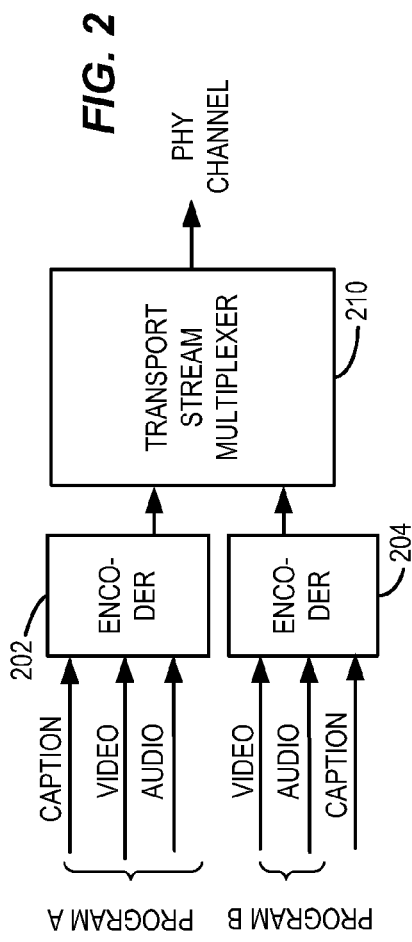
FIG. 2 is an example encoder consistent with certain embodiments of the present invention.

Referring now to FIG. 2, a basic diagram of a service provider such as a broadcaster is depicted. Generally speaking, a single service provider may provide multiple programs over one or more transport streams. The audio, video and caption data are provided to an encoder which encodes the data into packets suitable for distribution, including caption data packets as described above. As shown, Program A and Program B are encoded by encoders 202 and 204 which are then provided to a transport stream multiplexer 210 which then provides an output that can be distributed via a physical channel medium such as terrestrial, cable or satellite broadcast. In this discussion, the use of the term "Program" is consistent with that of the MPEG-2 Systems standard (ISO/IEC 13818-1). An MPEG-2 Program has the associated Elementary Stream components, such as for example one video Elementary Stream and one or more audio Elementary Streams. In accord with the implementation described above, the caption disparity data 110 is provided as user_data( ) within the video Elementary Stream, but this is not to be considered limiting since other implementations that carry the caption disparity data in other transport mechanisms which are described or referenced hereinafter. However, it is to be noted that the caption disparity data may be encoded in any suitable manner using the present transport mechanism without limitation. Similarly, disparity data encoded as will be described later can be transported using any suitable transport mechanism without limitation.

Figure 3:
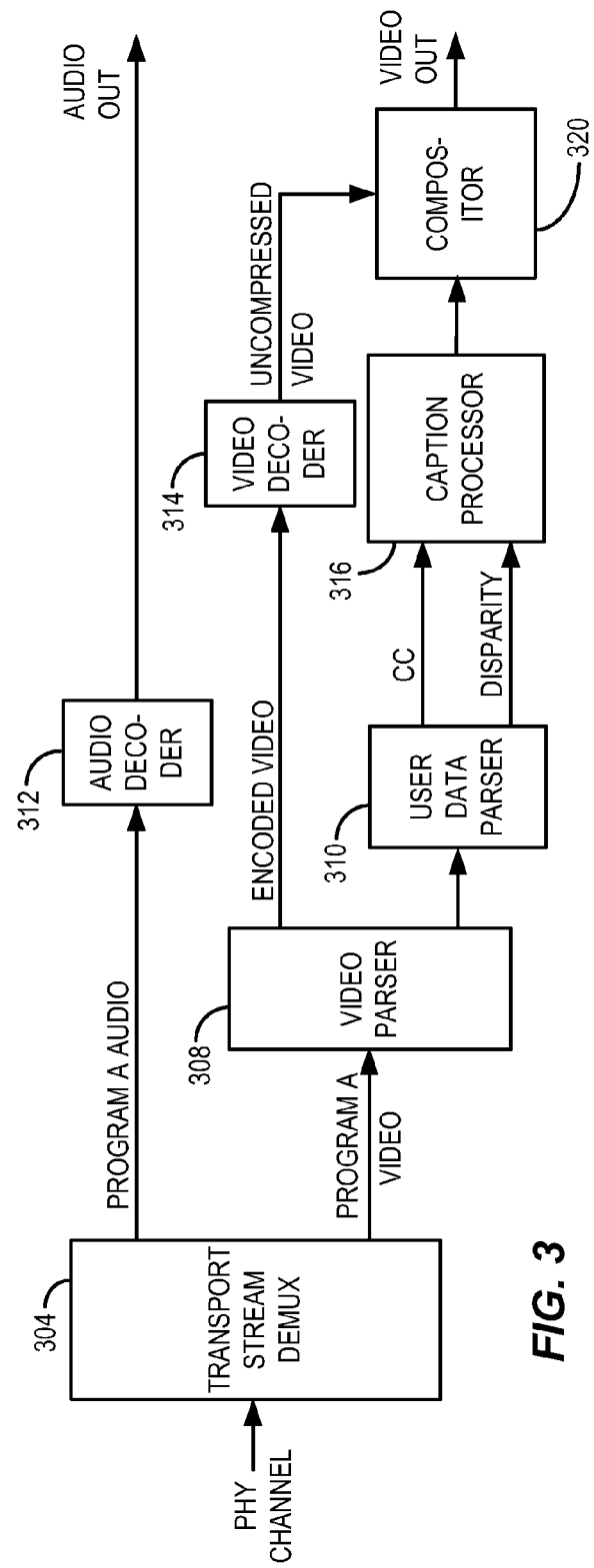
FIG. 3 is an example decoder consistent with certain embodiments of the present invention.

The encoded data from the physical channel is received at a television receiver device (e.g., a television or a set top box) as depicted in FIG. 3. The transport stream is demultiplexed at transport stream demultiplexer 304 to produce one or more elementary streams including audio, video (with embedded caption data), as well as other data not shown. A video parser 308 extracts compressed video data from the video elementary stream and sends it to video decoder 314 for decoding. Video parser 308 extracts the user_data( ) blocks from the video elementary stream and sends them to user data parser 310. Transport stream demux 304 selects audio packets and delivers them to audio decoder 312 to produce audio data as an output. When using the above transport mechanism, a user data parser 310 examines the user_data( ) portion of the video stream and separates out the DTVCC transport channel and the caption disparity data. When other transports are used for the DTVCC and disparity data, the CC data and the disparity are parsed out using a suitable parsing mechanism matched to the transport.

The closed caption-related data is processed at a caption processor 316. The caption processor renders caption text using the disparity data that defines the x-axis separation of left eye and right eye images to produce the perceived z-axis position of the caption text and its associated window. The resulting caption images are then composited at compositor 320 with the video data so as to produce 3D video with captions placed according to the data in the caption data packets in the x, y and z plane. Such data may place the captions in a static manner (wherein the z-axis position stays constant during the display of the given caption segment) or dynamically (where the z-axis position moves in time during display) in accordance with the authoring of the caption data. The caption data can then be rendered along with the program video on a video display (not shown).

Figure 4:
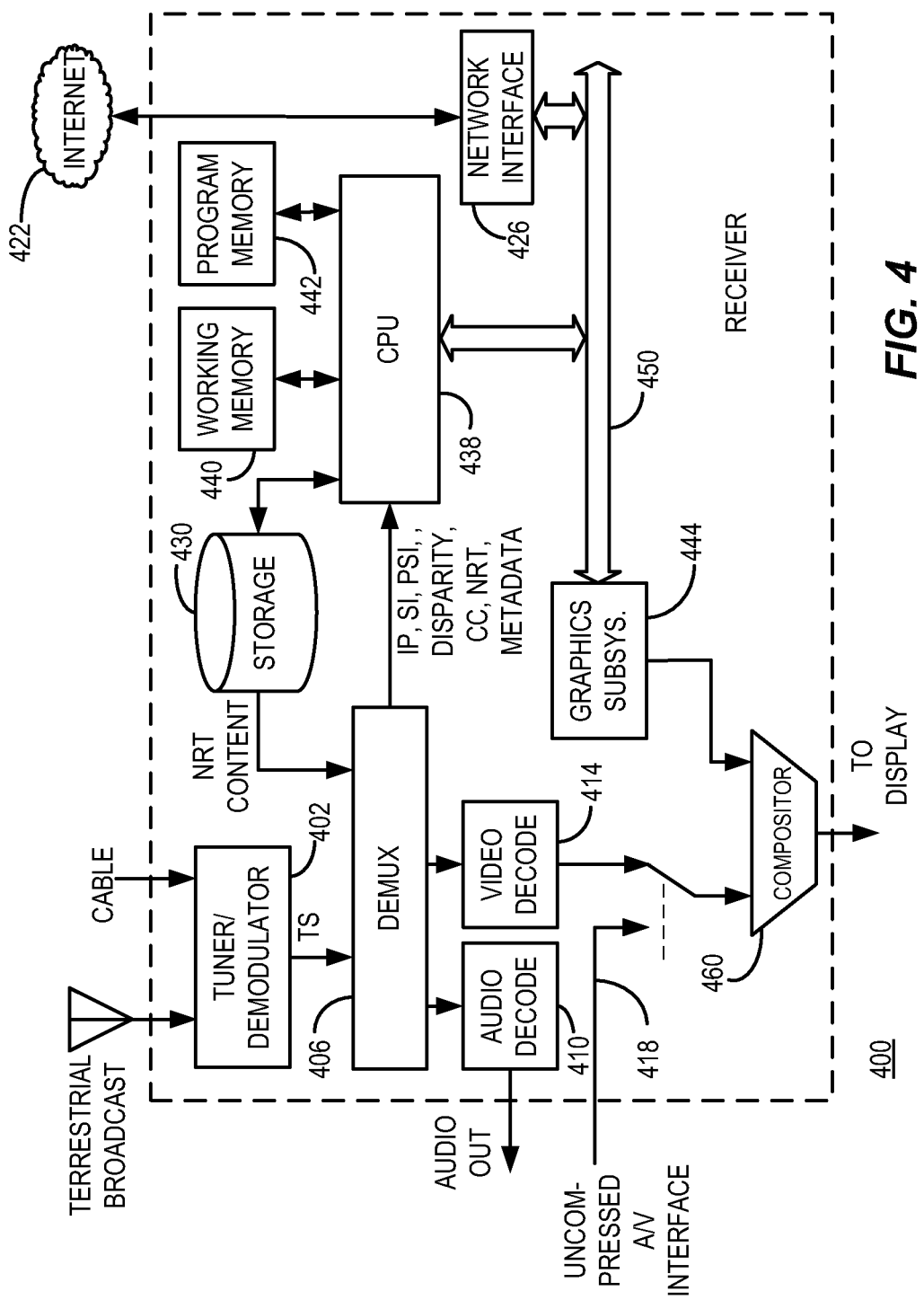
FIG. 4 is an example television receiver device consistent with certain embodiments of the present invention.

A receiver device is depicted in greater detail in FIG. 4 wherein content is received via any suitable source such as terrestrial broadcast, cable or satellite at a receiver 400's tuner/demodulator 402. The transport stream including the caption data from the tuner/demodulator 402 is demultiplexed at demultiplexer 406 into audio and video streams. The audio is decoded at an audio decoder 410 while the video is decoded at a video decoder 414. Uncompressed A/V data may also be received via an uncompressed A/V interface 418 that can be selectively utilized.

A/V content may also be received via the Internet 422 via a network interface 426 for IP television content decoding. Additionally, storage 430 can be provided for non-real time (NRT) stored content. The NRT content can be played by demultiplexing at 406 in a manner similar to that of other sources of content. The receiver generally operates under control of a processor such as CPU 438 which is interconnected to working memory 440 and program memory 442 as well as a graphics subsystem 444 via one or more buses such as 450.

The CPU 438 receives closed caption data from the demultiplexer 406 as well as the disparity data by whatever transport mechanism (e.g., via the caption data packets as described above or other mechanism as referenced below) and determines by parsing the data what horizontal separation of left eye and right eye positions are to be used to create the perception of z-axis position as well as x and y position to locate the caption data. This information is passed to the graphics subsystem 444 and the images are composited at the compositor 460 to produce an output suitable for display on a video display.

Thus, a method of communication of closed caption data to a television receiver device involves packaging closed caption text in a digital television caption channel stream of packets; transporting and delivering disparity data that defines a z-axis position for the closed captioning text for each frame of video displayed with closed captions within a stream of digital television user data packets; transmitting the digital television caption channel stream of packets to the television receiver device as a part of a transport stream that carries audio/video data associated with the closed caption text; and transmitting the stream of digital television user data packets containing the disparity data to the television receiver device outside of the transport stream that carries the audio/video data associated with the closed caption text.

And, a method of processing closed caption data in a television receiver device involves receiving a digital television caption channel stream of packets to the television receiver device as a part of a transport stream that carries audio/video data associated with the closed caption text; receiving a stream of digital television user data packets containing the disparity data to the television receiver device outside of the transport stream that carries the audio/video data associated with the closed caption text; and placing the closed caption text in a closed caption window for display on a three dimensional video display with the closed caption window positioned along a z-axis in a position defined by the disparity data.

Figure 5:
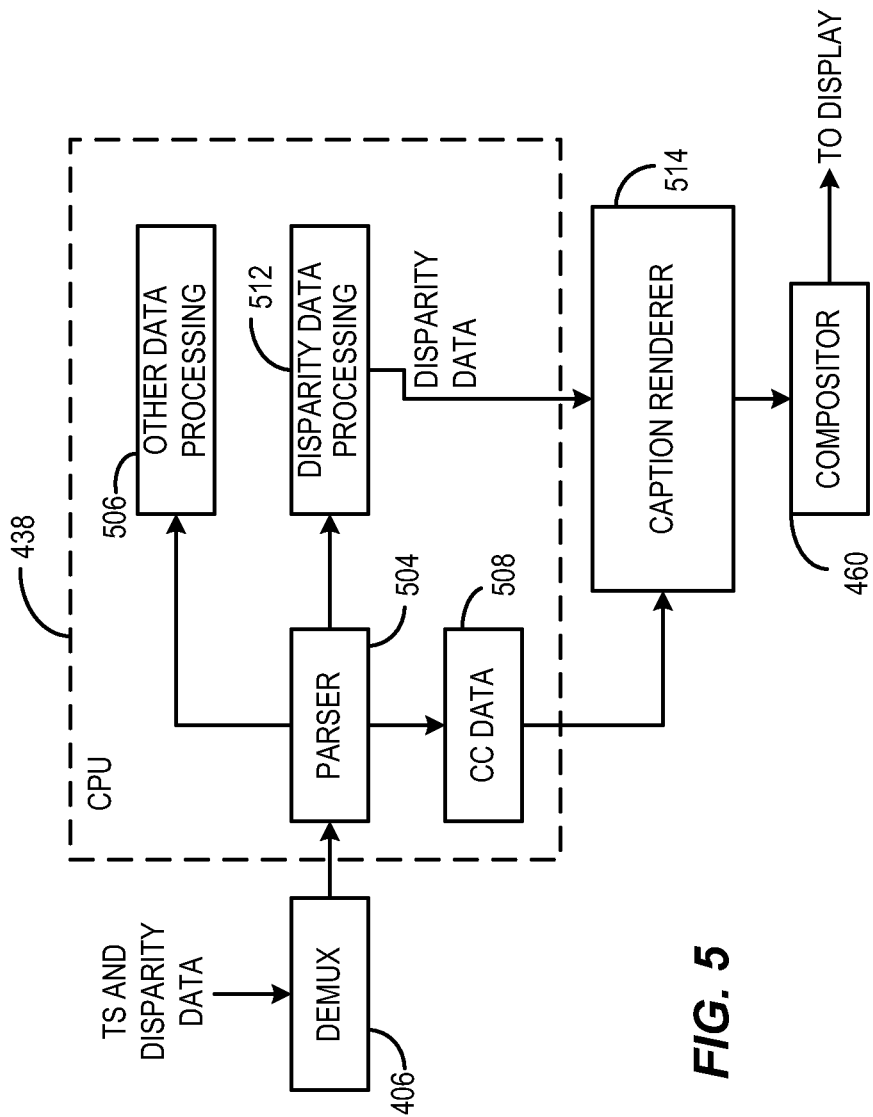
FIG. 5 is an example block diagram depicting the various operations of a processor consistent with certain embodiments of the present invention.

FIG. 5 depicts one implementation of the program modules used to process the caption data supplied in the manner described herein. In this example implementation, the CPU 438 operating under program control from program memory 442 and using working memory 440 receives the demultiplexed transport stream from demultiplexer 406 (via any suitable transport mechanism) and a parser module 504 produces the caption data (that is, the caption text and associated commands to create and position caption windows) at 508 and sends the disparity data to disparity data processing module 512 where the disparity data are extracted for use by the caption renderer 514 for processing. Other data may be parsed by parser 504 to other data processing modules as indicated by 506. The processed caption data are then composited at compositor 460 with the video data from the demultiplexer 406 to produce data for display with the position of the CC data positioned as specified in the disparity data.

In certain implementations consistent with embodiments of the invention, the amount of data used to define the z-position can be minimized and either transported along with the caption text and the video portion of the DTV transport stream or in separate user_data( ) packets as described above.

When the disparity data is delivered outside the DTV Transport Channel, the caption disparity data does not impact the DTVCC buffer model or data rates, and can be multiplexed into the Video separately from caption data. Note: there are other types of user data defined in the standards, such as active format description (AFD) and Bar Data. In accord with certain embodiments consistent with the present invention, the caption disparity data can be transported as a type of picture user data. However, this should not be considered limiting since the transport mechanism described above is only one of several mechanisms for transport of the disparity data encoded in the manner described later. For example, the disparity data can be transported using the techniques described in U.S. patent application Ser. No. 13/022828, filed concurrently herewith entitled "Service Linkage to Caption Disparity Transport" to Eyer, or U.S. patent application Ser. No. 13/022810, filed concurrently herewith entitled "Extended Command Stream for Closed Caption Disparity" to Eyer, both of which are hereby incorporated by reference, could also be used without limitation.

In accord with certain preferred embodiments, the amount of data used to transport the disparity data can be dramatically reduced to minimize impact on the available bandwidth for caption service regardless of the transport mechanism as will be described later.

In order to define the data structure as one would portray the definition in a technical standard specification, as depicted below, an example data structure which fits into the framework of ATSC A/72 Part 1, AVC Video (for ATSC) and A/53 is provided. Text is copied here from A/72 Part 1 and A/53 Part 4. Portions of the specification that are modified to accommodate the presentation of disparity data for this example implementation of the present invention are depicted in the following portions:

- Table 1 corresponds with Table 6.4 in A/72 Part 1 (2008);
- Table 2 corresponds with Table 6.5 in A/72 Part 1 (2008);
- Table 3 corresponds with Table 6.8 in A/52 Part 4 (2009);
- Table 4 corresponds with Table 6.9 in A/52 Part 4 (2009), with a new code point added here (user_data_type_code_value 0x07);
- Tables 5 through 7 are original;
- All definitions following and relating to Table 5 (service_number, extended_service_, etc.) are original;
- All definitions following and relating to Table 6 (disparity (i), offset_precision, etc.) are original.

With these changes in mind, a specification for delivery of caption data can be developed that is similar to that presented below as a Sample Standard and used as the basis for standardizing delivery of captions in accord with the discussion above:

EXAMPLE 1

Sample Standard Text

TABLE 1

| SEI Syntax | | |
|---|---|---|
| Syntax | No. of Bits | Format |
| user_data_registered_itu_t_t35 ( ) { | | |
|     itu_t_t35_country_code | 8 | bslbf |
|     itu_t_t35_provider_code | 16 | bslbf |
|     user_identifier | 32 | bslbf |
|     user_structure( ) | | |
| } | | | itu_t_t35_country_code—A fixed 8-bit field, the value of which shall be 0xB5 assigned per the requirements of ITU-T T.35.

itu_t_35_provider_code—A fixed 16-bit field, the value of which shall be 0x0031 assigned per the requirements of ITU-T T.35.

user_identifier—This is a 32 bit code that indicates the syntax and semantics of the user_structure( ) as indicated in Table 6.7 of ATSC A/53 Part 4.

user_structure( )—This is a variable length data structure defined by the value of user_identifier and Table 2.

TABLE 2

| user_identifier | |
|---|---|
| user_identifier | user_structure( ) |
| 0x47413934 ("GA94") | ATSC_user_data( ) |
| 0x44544731 ("DTG1") | afd_data( ) |
| all other values | Not defined in this Standard. |

ATSC_user_data( ) syntax and semantics shall be those given in Table 3 for the "ATSC_user_data( )" structure. While those syntax and semantics are nominally MPEG-2 specific, they are fully applicable to AVC.

TABLE 3

| ATSC_user_data Syntax | | |
|---|---|---|
| Syntax | No. of Bits | Format |
| ATSC_user_data( ) { | | |
|     user_data_type_code | 8 | uimsbf |
|     user_data_type_structure( ) | | |
| } | | | user_data_type_code—This is an 8-bit value that identifies the type of ATSC user data to follow in the user_data_type_structure( ) and shall be set according to Table 4.

TABLE 4

| user_data_type_code Value Assignments | |
|---|---|
| user_data_type_code value | user_data_type_structure( ) |
| 0x00-0x02 | ATSC Reserved |
| 0x03 | MPEG_cc_data( ) |
| 0x04-0x05 | ATSC Reserved |
| 0x06 | bar_data( ) |
| 0x07 | caption_disparity_data( ) |
| 0x08-0xFF | ATSC Reserved |

Example Caption Disparity Data syntax is shown in Table 5.

TABLE 5

| Caption Disparity Data Syntax | | |
|---|---|---|
| Syntax | No. of Bits | Format |
| caption_disparity_data( ) { | | |
|     service_number | 4 | uimsbf |
|     caption_window_count | 3 | uimsbf |
|     marker_bit | 1 | '1' |
|     if (service_number = 0xF) { | | |

TABLE 5-continued

Caption Disparity Data Syntax

| Syntax | No. of Bits | Format |
|---|---|---|
| reserved | 2 | '11' |
| extended_service_number | 6 | bslbf |
| } | | |
| for ( i=0 ; i < caption_window_count; i++ ) { | 1 | '1' |
| caption_window_id[i] | 3 | uimsbf |
| temporal_extension_flag | 1 | bslbf |
| data_valid | 1 | bslbf |
| select_view_shift | 2 | bslbf |
| disparity[i] | 9 | simsbf |
| if (temporal_extension_flag) { | | |
| offset_precision | 1 | bslbf |
| marker_bit | 1 | '1' |
| for (k=0; k<11; k++) { | | |
| offset_sequence[i,k] | 2 | bslbf |
| } | | |
| } | | |
| } | | |
| } | | | service_number—This 4-bit unsigned integer value in the range zero to 15, when in the range 1 to 14, shall indicate the CEA-708 caption service number associated with this set of disparity data. Value zero shall indicate the included disparity data applies equally to all caption services. Value 15 shall indicate the service number is in the range 15-63, and shall be specified in the extended_service_number field.

extended_service_number—This 6-bit unsigned integer value in the range 15 to 63 shall indicate the CEA-708 caption service number associated with this set of disparity data.

caption_window_count—This 6-bit unsigned integer value in the range one to 63 shall indicate the number of sets of disparity data present in this caption_disparity_data( ) instance.

caption_window_id[i]—This 3-bit unsigned integer value in the range zero to 7 shall indicate the CEA-708 caption window ID for which disparity data in this instance of the "for" loop applies.

temporal_extension_flag—This one-bit flag shall indicate, when set to '1', that temporal extension data is included in this instance of the caption_window_count "for" loop. A value of '0' in temporal_extension_flag shall indicate no temporal extension data is included in this instance of the caption_window_count "for" loop.

data_valid—This one-bit flag shall indicate, when set to '0', that the disparity[i] data, select_view_shift and temporal extension data to follow (if present) have no meaning. When data_valid is set to '1', the disparity[i] data (and temporal extension data to follow, if present) shall have meaning. Note: data_valid='0' may be used to create place-holder user data in the multiplex, up-stream of insertion of valid disparity data.

select_view_shift—This 2-bit quantity shall specify the method used to apply the disparity to the Left and Right views, according to the following table.

TABLE 6 select_view_shift Coding

| select_view_shift value | Meaning |
|---|---|
| '00' | Reserved |
| '01' | Shift left view: Left view is shifted by the amount given in disparity[i] (left for negative values, right for positive values). Right view is not shifted. |
| '10' | Shift right view: Right view is shifted by the amount given in disparity[i] (left for negative values, right for positive values). Left view is not shifted. |
| '11' | Shift both views (in opposite directions): For even values of disparity[i]: Left view is shifted by (disparity[i]/2) (left for negative values, right for positive values) Right view is shifted in the opposite direction by (disparity[i]/2) For odd values of disparity[i]: Left view is shifted by ((disparity[i] + 1)/2) (left for negative values, right for positive values) Right view is shifted in the opposite direction by ((disparity[i] − 1)/2) | disparity[i]—This 9-bit signed integer value shall indicate the number of units of disparity between the left and right views relative to a 1920-unit horizontal grid. Positive values shall indicate the Right view is shifted to the right of the Left view. Negative values shall indicate the Right view is shifted to the left of the Left view.

offset_precision—This 1-bit flag shall specify the precision of the values specified in offset_sequence[i,k] in this iteration of the caption_window_count "for" loop. When set to '0', offset_precision shall indicate one-pixel precision. When set to '1', offset_precision shall indicate two-pixel precision.

offset_sequence[i,k]—This set of eleven 2-bit values shall specify frame-to-frame changes in disparity over an eleven-frame period. offset_sequence[i,0] shall indicate the delta in the disparity value between the current frame and the next, offset_sequence[i,1] shall indicate the delta in the disparity value between that frame and the following, and so on. The amount of change in each frame shall be indicated by the coding of offset_sequence[i,k] as shown in the following table.

TABLE 7 offset_sequence[i,k] Coding

| offset_sequence[i,k] value | Meaning |
|---|---|
| '00' | No change in disparity from the prior frame. |
| '01' | Positive change in disparity from the prior frame by the amount given in offset_precision. |
| '10' | Negative change in disparity from the prior frame by the amount given in offset_precision. |
| '11' | No frame is assigned for the offset sequence. |

In the above EXAMPLE 1, the disparity data are defined and encoded as an offset with one- or two-unit precision. However, this level of precision in the disparity is not as precise as one might desire on a frame-by-frame basis. While an initial placement at a disparity value with a precision of 1/1920 of the screen width is probably sufficient, smooth motion in the depth plane requires a higher resolution.

In the method of this first example, the caption disparity data is transported within a user_data( ) packet using a unique value of user_data_identifier_code (Table 4). The present example it is useful as an illustration of one type of disparity data that can be transported outside the DTVCC transport channel as user_data( ) to transport the caption disparity data 110 as depicted in FIG. 1.

The above example provides for encoding and transport of caption disparity data, but unfortunately, for caption windows that move in the z-axis direction over time, the caption disparity data is not encoded in the most efficient manner and may require substantial amounts of bandwidth to transmit. Additionally, a disparity resolution of ¹⁄₁₉₂₀ of the screen width has been found to be too coarse for frame-by-frame samples of disparity. Finer granularity is needed when specifying the disparity for objects that move smoothly in depth over time.

In general, one may wish to author the disparity and caption data somewhat simultaneously so as to permit placement of the captioning in an appropriate position in the z axis in the video frame so that other objects do not intersect the caption display. In other words, for proper rendering of the scene, a caption window should appear closer to the viewer than any object it overlays. Intersection in the z axis of the caption window with the object it overlays causes viewer fatigue, as the depth cues given by the object and the caption window are in conflict with each other.

The captions may be generally rendered based on the dialog or other sounds that are represented in the video. So, for example, each segment of dialog (e.g., from one actor) may appear in a separate caption text window. That window may be rendered in a static location if the receiver is incapable of adjusting the z-axis position dynamically (due to, for example, insufficient CPU or graphics processing power).

Preferably, the caption data is authored so as to be represented with a z-axis position for each individual frame associated with each segment of dialog. In this manner, during the time of its display, a given closed caption window and its associated text may move closer to or farther away from the viewer in a manner desired by the caption author. The x and y position of a given closed caption window can be defined according to the CEA-708-D standard, but the z-position may be changed dynamically by adoption of a mechanism that defines the perceived movement along the z-axis as will be described.

Figure 6:
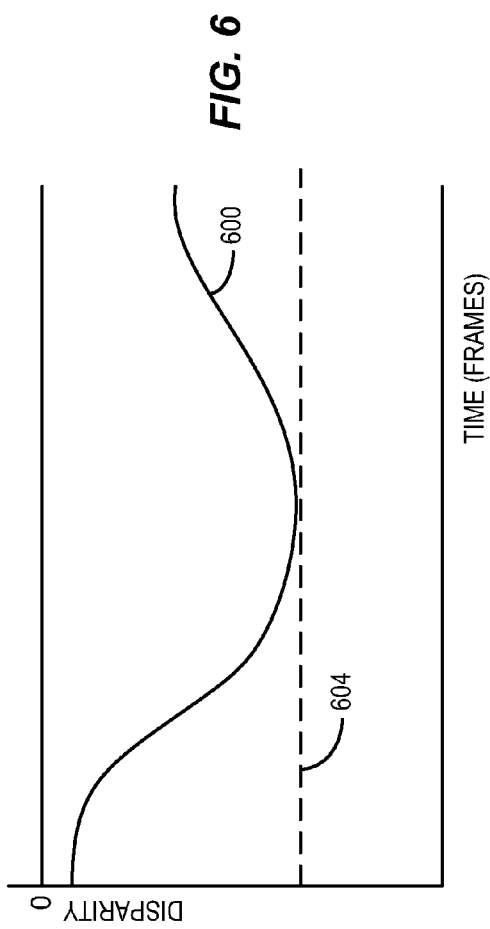
FIG. 6 is a graph depicting an example curve representing authored disparity data consistent with certain embodiments of the present invention.

If the perceived z-axis position over time (over a number of sequential frames of video) is graphed as depicted in FIG. 6, the disparity may be represented as a curve representing movement of the window in the z-axis (toward the viewer side of the display if represented as a negative value [a negative disparity value represents positions perceived to be in front of the display]) and away from the user moving toward the display and ultimately appearing to be behind the display if represented as an positive value (a positive number represents positions behind the display; the display screen itself is at z-axis position zero). Curve 600, therefore, can represent display of an object beginning at a starting depth at the far left and first moving toward the viewer until the bottom of the curve 600 is reached at which point the disparity data takes on a positive slope (motion in depth away from the viewer). Such an authored disparity position in the z-axis can permit the window containing caption text to move smoothly in the video display to track an object in the scene and avoid interference with other objects. In order to carry such distinct information for each video frame, such as for example a sample of the value of the curve at each frame, a substantial amount of data may be required.

As will be apparent from later disclosure, certain lower-capability receivers may not be outfitted with the ability to dynamically adjust the disparity in a manner that tracks the authored disparity curve of 600. In those instances, a fixed disparity value such as 604 may be provided as an "alternate disparity" which is statically located in the z-axis for a particular caption window in a manner as described later. The alternate disparity can be set for a perceived distance of the caption window represented by 604 to be approximately at the closest perceived level of disparity curve 600 to assure no interference between the caption window and other screen objects in perceived depth. This fixed alternate disparity value can be provided as will be described later. In accord with certain implementations consistent with the present invention, both a dynamically changing set of data representing authored disparity and an alternate static disparity value can both be transmitted to and received by the TV receiver. In this manner, the TV receiver device can utilize the static alternate disparity if, for example, it does not have enough processing power to deal with a frame by frame disparity change. It is also noted that captions, whether the display position is dynamically changing or static, are displayed in a manner that matches dialog and other sounds or commentary in the accompanying video. So, the x-y and z positions for the CC window may change on a phrase by phrase or other frequent basis as it accompanies A/V content and each CC window will only generally be displayed for a few seconds or so. Thus, each window of CC data will have its own sequence of data describing dynamically authored disparity and an alternate static disparity.

Figure 7:
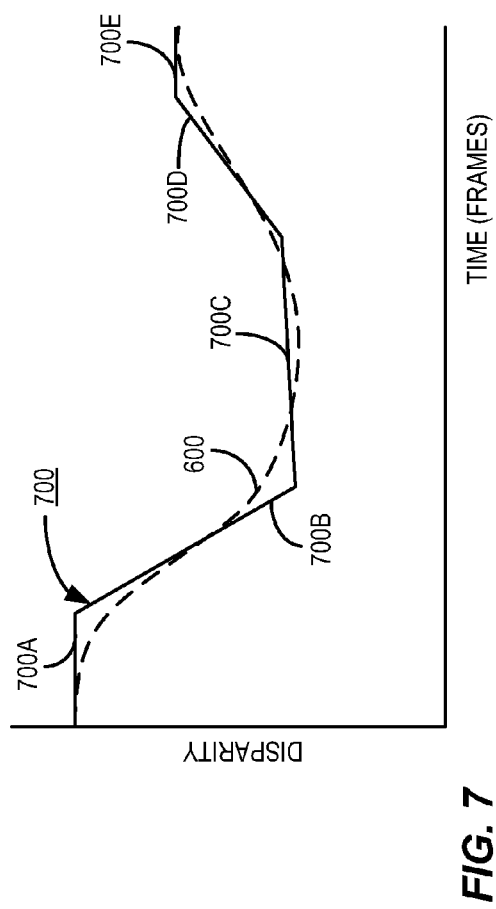
FIG. 7 is a graph depicting an example of a piecewise linear approximation of the disparity curve consistent with certain embodiments of the present invention.

The data of curve 600 may be approximated as shown in FIG. 7 as a piecewise-linear approximation 700. (It should be noted that the approximation presented in FIG. 7 is a gross approximation used for clarity in illustration, and a much better approximation of curve 600 is possible. Additionally, the rendering can be improved by low pass filtering the piecewise-linear approximation if the receiver has such capability.) In this example, curve 700 having multiple segments 700A, 700B, 700C, 700D and 700E in this illustration approximates the disparity curve 600 with changes in slope occurring at the breakpoints defining a change from one line segment to the next (e.g., the change from 700B to 700C). This piecewise-linear approximation can be encoded by assuming a defined starting disparity value and slope (or providing a starting value and slope) and then encoding the number of frames over which a particular segment of the approximation with a particular slope is to be considered valid, and an amount to change the slope at that point in time. Hence, in one implementation the only information that needs to be transmitted to establish each breakpoint is a number of frames and a change in slope from the prior slope. One can assume the starting value of the slope as being zero. One unit of slope can be defined as a number of disparity units of change over a predetermined time interval specified in frames. The calculations required in the receiver are simplified if the predetermined time interval is specified as a power of two. For example, if the predetermined time interval is $2^5$ or 32, the calculated disparity value at any given frame can always be represented with binary arithmetic in which five bits to the right of the decimal point are maintained. Other powers of 2 can also be used without limitation to derive the same benefit.

It is convenient to represent the slope change with a small number to minimize the amount of transmitted data. For example, a 5-bit 2's complement signed integer in the range −16 to +15 that indicates the amount of change in slope to apply over the designated number of frames can be used.

Again for ease of implementation, it may be convenient to represent one unit of disparity as ¹⁄₁₉₂₀ of the screen width. With this choice, when the display resolution is 1920 pixels horizontally, one unit of disparity is equal to the width of one pixel, but this is not to say that rendered disparity values always have one pixel of resolution.

As noted above, the representation of FIG. 7 represents an exaggerated approximation of the piecewise-linear model so that the two curves can be clearly seen in a black and white line drawing, but the approximation can be closer than shown by better selection of the slope and breakpoints of the line segments. It is also noted that, once received by a receiver, the piecewise-linear approximation can be improved if desired by low pass filtering which will in essence convert the abrupt changes in slope occurring at the breakpoints into smooth curves that more closely approximate the authored disparity curve. It is also noted that using the present approximation also provides fractional-unit granularity for dynamic changes to the z-axis position of the caption window and associated closed caption text.

The example below provides for the disparity data to be sent using an extended service that is mapped from the main service number for the caption text. This mapping is discussed in greater detail in U.S. patent application Ser. No. 13/022,828, filed of even date herewith to Eyer, et al. entitled "Service Linkage to Caption Disparity Transport" which is hereby incorporated by reference.

EXAMPLE 2

Standard Supplementation for Disparity Encoding

Augmentation Services

Caption disparity data for a given caption service shall be delivered in an "Augmentation Service." An Augmentation Service shall be considered to be a caption service that provides additional commands and data for the caption service it is associated with. The Augmentation Service associations shall be as shown in Table I. As shown, commands and data transported in Extended Service #49 are considered to be effectively part of Service #1, commands and data transported in Extended Service #50 are considered to be part of standard Service #2, etc.

TABLE I

Augmentation Service Number Associations

| Service Number | Augmentation Service Number |
|---|---|
| 1 | 49 |
| 2 | 50 |
| 3 | 51 |
| 4 | 52 |
| 5 | 53 |
| 6 | 54 |

Augmentation services are only defined for Standard caption Services #1 through #6.

Set Disparity—(DISP)

Name: SetDisparity—Specify disparity for 3D captioning
Format: Variable-length
Command Coding: EXT1, 90h, caption_disparity_data( )

| | $b_7$ | $b_6$ | $b_5$ | $b_4$ | $b_3$ | $b_2$ | $b_1$ | $b_0$ | |
|---|---|---|---|---|---|---|---|---|---|
| d | 0 | 0 | 0 | 1 | 0 | 0 | 0 | 0 | EXT1 |
| e | 1 | 0 | 0 | 1 | 0 | 0 | 0 | 0 | 90h |
| s | | | Caption_disparity_data( ) | | | | | | (variable length) |

Description: Caption disparity data shall be transported in a
SetDisparity command within an Augmentation Service using the syntax and semantics defined below. SetDisparity specifies the amount of horizontal offset between the left- and right-eye views (disparity) for one or more caption windows when captioning is used with stereoscopic 3D programming.

Caption Disparity Data

The syntax of Caption_disparity_data( ) shall be as shown in Table II.

TABLE II

| | No. of bits | Format | No. of Bytes |
|---|---|---|---|
| Caption_disparity_data( ) { | | | |
|   reserved | 3 | '11' | 1 |
|   Zero | 1 | '0' | |
|   command_length | 5 | uimsbf | |
|   reserved | 5 | bslbf | 1 |
|   caption_window_count | 3 | uimsbf | |
|   for ( i=0 ; i < caption_window_count; i++ ) { | | | |
|     caption_window_id | 3 | uimsbf | 2 |
|     temporal_extension_flag | 1 | bslbf | |
|     reserved | 3 | bslbf | |
|     disparity[i] | 9 | simsbf | |
|     if (temporal_extension_flag) { | | | |
|       alternate_disparity[i] | 9 | simsbf | 2 |
|       reserved | 2 | bslbf | |
|       segment_count | 5 | uimsbf | |
|       for (k=0; k<segment_count; k++) { | | | |

TABLE II-continued

|  | No. of bits | Format | No. of Bytes |
|---|---|---|---|
| frame_count | 5 | uimsbf | 1.25 |
| segment_slope_change | 5 | simsbf |  |
| }
for (m=0; m<(3−((segment_count−1) mod 4)); m++) { |  |  |  |
| reserved | 2 | bslbf | 0.25 |
| }
}
}
} |  |  |  |

Note: In this implementation, with reference to the above table, win_info is defined using:

caption_window_count—a 3-bit unsigned integer in the range 1 to 7 that shall indicate the number of caption windows included in this instance of the caption_disparity_data( )

caption_window_id—a 3-bit unsigned integer that shall identify the Window ID in the corresponding service for which disparity data is being given in this iteration of the "for" loop.

temporal_extension_flag—a 1-bit flag that, when set to "1", shall indicate data is included that identifies a time-varying disparity path. When set to "0" the flag shall indicate that the last field present in the command is disparity[i].

disparity[i]—a 9-bit 2's complement signed integer that shall indicate the disparity value of the associated caption window, i, given in caption_window id, relative to 1920 horizontal pixels. Value zero shall reference the screen plane. Negative values shall correspond with perceived depths in front of the screen. Positive values shall correspond with perceived depths behind the screen.

alternate_disparity[i]—a 9-bit 2's complement signed integer that shall be coded the same as disparity[i]; it shall specify a disparity value that may be used in place of the values given in the piecewise-linear path by decoders that are not able to render time-varying caption windows.

segment_count—a 5-bit unsigned integer in the range 1 to 31 that shall indicate the number of segments to follow.

frame_count—a 5-bit unsigned integer in the range 0 to 31 that shall indicate the number of video frames that shall elapse prior to the application of the segment_slope_change field immediately following.

segment_slope_change—a 5-bit 2's complement signed integer in the range −16 to +15 that shall indicate the amount of change in slope to apply at the frame indicated in frame_count. Slopes are specified in number of units of disparity over 32 frames. A slope value of zero shall be assumed at the starting point of the time-varying path.

Figure 8:
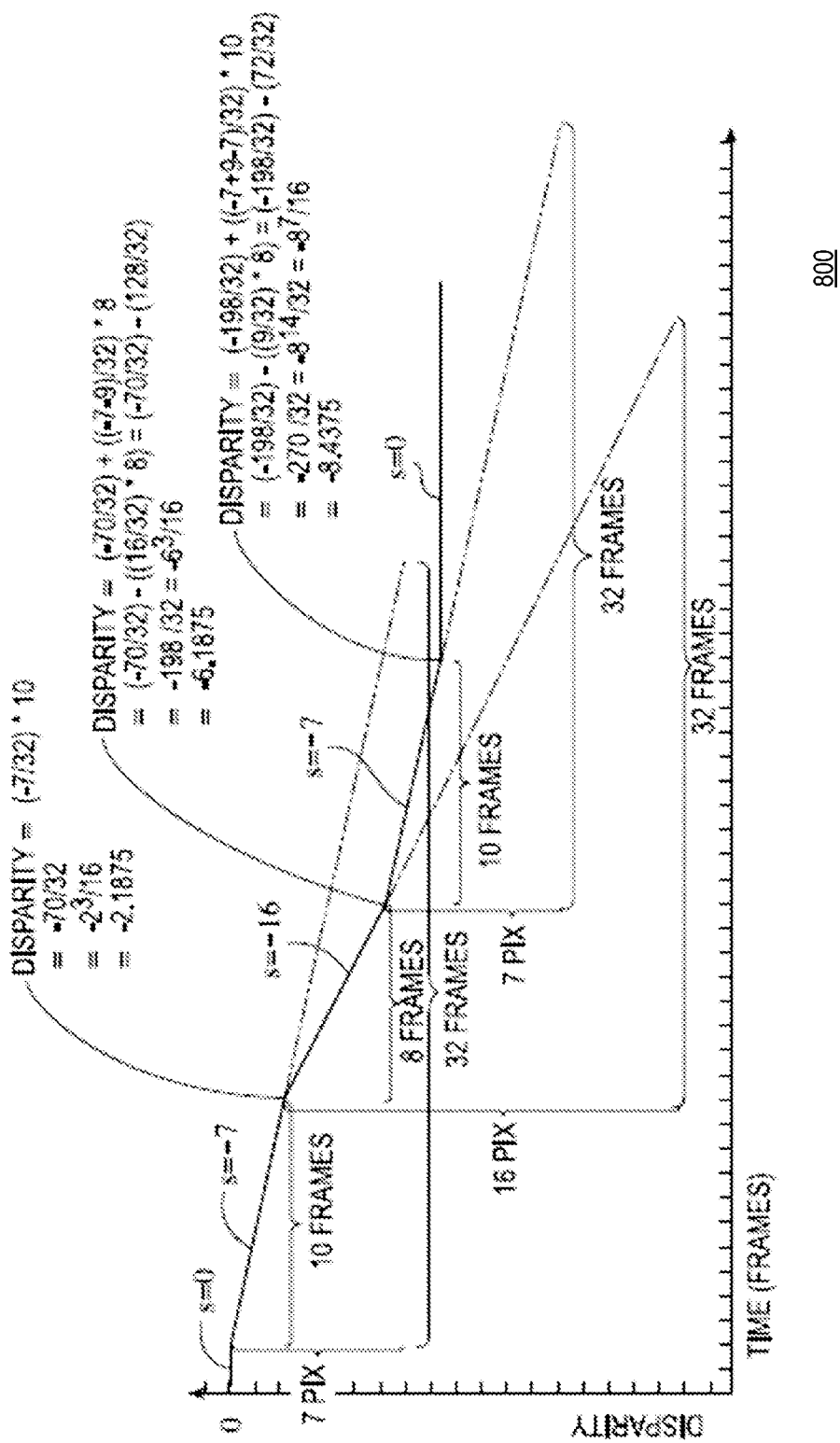
FIG. 8 is an example piecewise linear approximation of authored disparity data consistent with certain embodiments of the present invention.

FIG. 8 depicts a specific example of time varying caption disparity data. FIG. 8 shows a piecewise linear approximation of a disparity curve, using the data structure of Example 2 below. In Example 2, one unit of slope is defined to be equal to a change in one unit of disparity over a time interval of 32 frames. FIG. 8 shows the time line resulting from the following sequence of frame count (frame_count) and disparity slope changes (segment_slope_change) parameters: (2,−7), (10,−9),(8,+9) and (10,+7). In the first segment on the left, s=0 has a slope that is predefined to be zero. The first two slope changes are negative indicating that the caption window is moving toward the user with a disparity value starting at 0, progressing through −2.1875 to −6.1875 at the junction of the third and fourth segments. The positive slope changes at the next two segments result in a slope that represents a slowing of the movement in the z-axis toward the viewer and ultimately at the final segment the window comes to a rest at a constant disparity of −8.4375 in front of the display.

In this example the slope of the disparity curve is defined as starting at a value of zero. In the example, after two frames, the slope changes to −7 disparity units per 32 frames. After 10 frames, the disparity changes again to −16 disparity units per 32 frames. Eight frames later it changes back to −7, and 10 frames after that it changes back to zero.

The disparity at each frame can be computed precisely using binary arithmetic carrying five binary digits to the right of the decimal point (precision of 1/32 disparity unit). Receivers that do not support 1/32 disparity unit precision in rendering are expected to round the results at each frame to whatever rendering precision they do support, such as 1/16, 1/8, 1/4 pixel, etc. To avoid accumulated error, the computation of the disparity at each frame is expected to be preferably performed at full precision (1/32 unit), with rounding (if any) performed afterwards.

It is also noted that some receivers may be provided which do not support the dynamic time-varying change in disparity. For this reason, it is desirable to also specify a fixed disparity as shown in FIG. 6 that can be used as an alternative for less sophisticated receivers. This is specified as an "alternate disparity" value.

In order to accomplish an implementation of this concept, a data structure is adopted represent disparity data. Table II below shows an implementation of this data structure. Within 30 bytes, this data structure accommodates two windows with up to ten segments: 2 bytes (win_info)+2 bytes (seg_info)+ segment_count*1.25 bytes (frm_info)=16.5 bytes per window.

The disparity data as described above can be delivered in any suitable manner without departing from teachings consistent with implementations of certain embodiments consistent with the present invention. In one such implementation, it is desirable to map service numbers to extended services numbers or augmentation service numbers, while in other implementations, the disparity data can be conveyed in any manner including contemporaneously with the closed caption text and associated video or in advance as one or more blocks of data either in-band or out of band.

Figure 9:
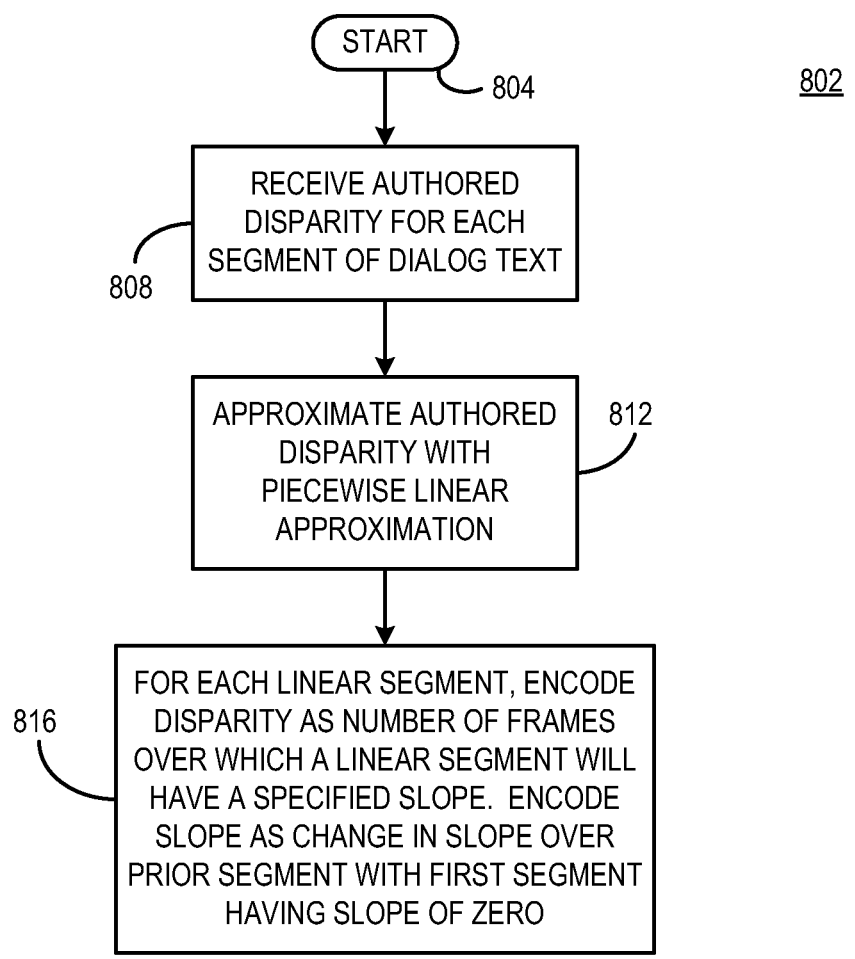
FIG. 9 is a flow chart of an example implementation of a method consistent with certain embodiments of the present invention.

An overall process consistent with certain example implementations of the disparity encoding is depicted in the flow chart 802 of FIG. 9 starting at 804. At 808, authored caption data are received, including caption window definition and text (e.g., representing each portion of a dialog) and disparity data. This data can be represented as a curve of disparity over time (over some number of frames) and is approximated by a piecewise-linear model approximation at 812. Any mechanism ranging from a manual approximation to any mathematical algorithm that creates a piecewise linear approximation of a curve can be used without limitation. Then, at 816, for each segment in the approximation, the disparity is encoded as a number of frames for each line segment and a change in slope over a prior line segment for that number of frames. The initial line segment is assumed to have a slope of zero.

Figure 10:
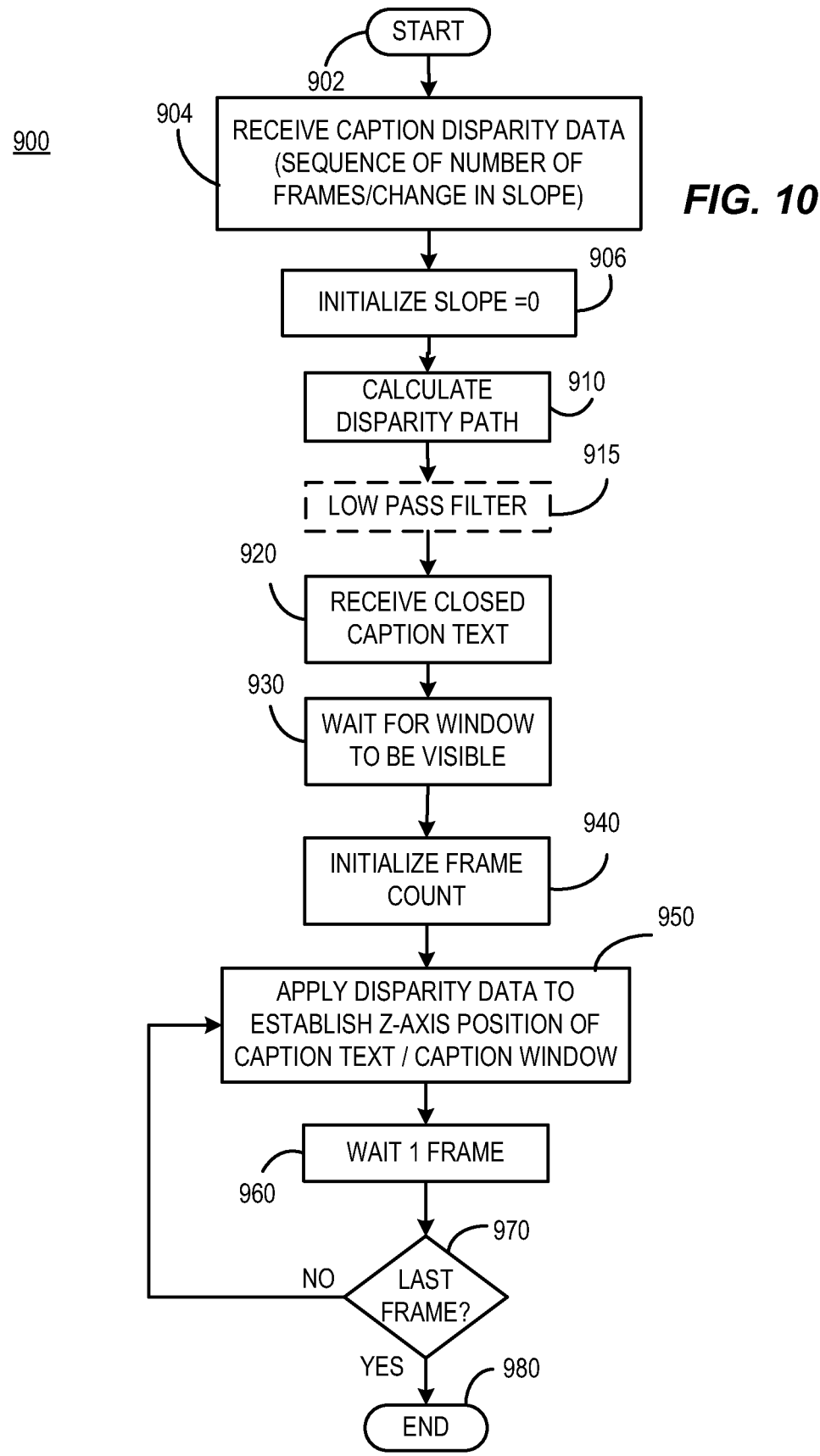
FIG. 10 is a flow chart of a more detailed example implementation of a method consistent with certain embodiments of the present invention.

The process carried out at the receiver can be represented in greater detail using an example process such as that shown as process 900 of FIG. 10. This process 900 starts at 902 with the reception of a command which defines a caption window (in CEA-708, this is the DefineWindow command). At 904 the disparity data is received as a sequence of number of frames/ slope change as described above. Next, the disparity for the first line segment is initialized to zero at 906. At 910 the data sequence is expanded to calculate the value of disparity for each frame within the interval of time covered in the command. A low-pass filter operation may optionally be performed, 915, on the path to smooth out the breakpoints. No caption rendering occurs until the closed caption text is received, and until the state of the caption window is set to "visible." At 920 the caption text is received, and at 930, the caption window is set to visible (if it was not initialized with the visibility attribute already set to true).

Once the text is available and the window is visible, the caption window and text can be rendered using the value of disparity calculated at each frame, 950. At each successive frame, 960, the next value of calculated disparity is rendered until the last frame is reached (test 970). When the last frame is reached, or the caption window is deleted or set to invisible (not shown), the process ends at 980.

It will be understood that these events may represent a continuous flow with text and caption data being received on an ongoing basis, so that the present representation is not to be construed as accurately depicting time. The order of the various operations in FIG. 10 may differ at the option of the implementer. For example, the initializing the slope to zero, calculating the path, and low-pass filtering (906, 910, and 915) could be executed after the window is made visible (930), or after the frame count is initialized (940). In other implementations, with suitable signaling, the caption disparity data may be received in advance of the definition of the caption window, so the timing shown in this flow chart 900 is depicted in this manner purely for ease of understanding.

Many variations in this process will be apparent to those skilled in the art upon consideration of the present teachings.

Thus, a method of transforming segments of authored closed captioning disparity data that defines a z-axis position for a window containing closed captioning text (a two dimensional window parallel to the screen) for display on a display into an encoded approximation of the disparity data involves approximating the segments of authored three-dimensional closed captioning disparity data as a piecewise linear approximation comprised of an ordered sequence of linear segments applicable over a sequence of frames with each segment connected to a subsequent segment at breakpoints; at an encoder, encoding the piecewise-linear approximation as a designated number of frames over which each linear segment is to be applied and a change in slope from the slope of a preceding segment in the sequence to produce the encoded approximation of the disparity data; and where a first segment in the sequence presumes a predetermined slope as a reference for change in slope.

The predetermined initial slope is preferably zero, but could be any other starting point either by convention or by conveyed information. The slope can be given as a representation of a fraction's numerator where the denominator of the fraction is a predetermined value of $2^N$, where N is an integer, so that only the numerator is required to convey the value of the fraction. In one preferred implementation, N=5, and the numerator can be represented by a value from −16 to +15, and one unit of slope is defined as a change of one unit of disparity over a time interval of 32 frames. In that case $2^N$ is 32 and a 5-bit 2's complement signed integer in the range −16 to +15 can be used to indicate the amount of change in slope to apply over the designated number of frames.

The method may further involve packaging the closed caption text in a digital television caption channel stream of packets; packaging the encoded closed caption disparity data within a stream of digital television user data packets that carries video data associated with the closed caption text. Those skilled in the art, upon consideration of the present teachings, will appreciate that the encoding using number of frames over which a slope is to be applied can be transported to the receiver in any suitable manner without departing from implementations consistent with the present invention.

The method may further involve establishing an alternate fixed disparity value that establishes a fixed z-axis position for the closed caption text and packaging the alternate fixed disparity value along with the encoded closed caption disparity data for use as an alternative z-axis position.

The method may also involve receiving the encoded disparity data and low pass filtering the encoded three dimensional disparity data to smooth transitions at the breakpoints.

The method may further involve packaging the closed caption text in a digital television caption channel stream of packets; and packaging the encoded closed caption disparity data as a command extension within a stream of digital television transport stream packets that carries audio/video data associated with the closed caption text or as user data. The method may also involve transmitting the digital television caption channel stream of packets and the encoded closed caption disparity data and the closed caption text to a television receiver device as a part of a transport stream that carries audio/video data associated with the closed caption text in any suitable manner.

Thus, in certain implementations, a method of decoding closed caption disparity data involves at a television receiver device, receiving closed caption disparity data encoded as a sequence of one or more frame interval/slope change pairs, with the frame interval representing a designated number of frames over which each linear function representing disparity is to be applied paired with a value indicating a change in slope from the slope of a preceding segment. A first segment in the sequence of disparity values presumes a slope of zero as a reference for subsequent changes in slope, and receiving a sequence of caption data packets where the sequence of caption data packets specify a closed caption display window containing closed caption text, where closed caption data is packaged in a digital television caption channel stream of packets. The disparity value is used in each frame in a 3D rendering of left and right eye views of the closed caption display to establish a horizontal offset that establishes the window's perceived z-axis position. The method further receives an alternate fixed disparity value that establishes a fixed disparity for the closed caption display packaged along with the encoded three-dimensional closed caption disparity data for use as an alternative perceived z-axis position. Low-pass filtering is used to filter the encoded three dimensional disparity data to smooth transitions in disparity values. The caption text and disparity data are processed to produce an output suitable for defining the rendering of a three dimensional image on a display of the caption text at a perceived z-axis position defined by the disparity data.

Another method of decoding closed caption disparity data involves at a television receiver device, receiving closed caption disparity data encoded as a sequence of one or more frame interval/slope change pairs, with the frame interval representing a designated number of frames over which each linear function representing disparity is to be applied paired with a value indicating a change in slope from the slope of a preceding segment. A first segment in the sequence of disparity values presumes a predetermined slope as a reference for subsequent changes in slope. A sequence of caption data packets is received, where the sequence of caption data packets specify a closed caption display window containing closed caption text. The disparity value is used in each frame to determine a horizontal offset of left and right eye views of the closed caption display that establishes the closed caption display window's perceived z-axis position.

In certain implementations, the predetermined slope is zero. In certain implementations, the slope change is given as a value representing a change in disparity over $2^N$ frames where N is an integer. In certain implementations, N=5. In certain implementations, the slope change is signaled as a value in the range −16 to +15 that indicates the amount of change in slope to apply over the designated frame interval. In certain implementations, the method involves receiving an alternate fixed disparity value that establishes a fixed perceived z-axis position for the closed caption display packaged along with the encoded three-dimensional closed caption disparity data for use as an alternative z-axis position. In certain implementations, the method involves low pass filtering the encoded three dimensional disparity data to smooth transitions in disparity values. In certain implementations, the method involves processing the caption text and disparity data to produce an output suitable for defining a rendering of a three-dimensional image on a display of the caption text at a perceived z-axis position defined by the disparity data.

A computer readable electronic storage device such as a non-transitory storage medium can be used for storing instructions that when executed on one or more programmed processors carry out any of the processes described herein.

A television receiver device that processes disparity data for closed captions in a manner consistent with certain implementations has a decoder that receives closed caption disparity data encoded as a sequence of one or more frame interval/slope change pairs, with the frame interval representing a designated number of frames over which each linear function representing disparity is to be applied paired with a value indicating a change in slope from the slope of a preceding segment. A first segment in the sequence of disparity values presumes a predetermined slope as a reference for subsequent changes in slope. A parser parses the disparity data and closed caption text from the one or more signals. A compositor receives the disparity data and the closed caption text and generates a sequence of video frame signals including a closed caption display window containing closed caption text with the closed caption display window has a perceived z-axis position in each frame defined by the disparity values.

In certain implementations, the predetermined slope is zero. In certain implementations, the frame interval is given as a predetermined value of $2^N$ frames, where N is an integer. In certain implementations, the slope change is given as a value representing a change in disparity over 32 frames. In certain implementations, the slope change is signaled as a value in the range −16 to +15 that indicates the amount of change in slope to apply over the designated frame interval. In certain implementations, the slope change is signaled as a value in the range −16 to +15 that indicates the amount of change in slope to apply over the designated frame interval. In certain implementations, the decoder further receives an alternate fixed disparity value that establishes a fixed z-axis position for a portion of the closed caption display packaged along with the encoded closed caption disparity data for use as an alternative perceived z-axis position. In certain implementations, a low-pass filter processes the encoded three dimensional disparity data to smooth transitions in disparity values. In certain implementations, the compositor further processes the caption text and disparity data to produce an output suitable for defining a rendering of a three-dimensional image on a display of the caption text at a perceived z-axis position defined by the disparity data.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as non-transitory storage devices including as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. The term non-transitory does not suggest that information cannot be lost by virtue of removal of power or other actions. Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in operational flow, user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of decoding closed caption disparity data, comprising:
at a television receiver device, receiving the closed caption disparity data encoded as a sequence of one or more frame interval and slope change pairs, each frame interval and slope change pair including a frame interval, which represents a designated number of frames that occur prior to application of the slope change paired with the respective frame interval, and a slope change value, which indicates a change in slope from the slope set by a preceding frame interval and slope change pair;

where the sequence of one or more frame interval and slope change pairs further includes an initial frame interval and slope change pair that precedes the one or more frame interval and slope change pairs, the initial frame interval and slope change pair including a slope change value which indicates a change in slope to be applied to a slope of zero;

receiving a sequence of closed caption data packets, where the sequence of closed caption data packets specify closed caption text, where the closed caption data packets are packaged in a digital television caption channel stream of packets;

where the closed caption disparity data is used in a 3D rendering of left and right eye views of the closed caption text to establish a horizontal offset that establishes a perceived z-axis position of the closed caption text corresponding to each frame;

receiving an alternate fixed disparity value that establishes a fixed disparity for the closed caption text packaged along with the closed caption disparity data for use as an alternative perceived z-axis position; and processing the closed caption text and the closed caption disparity data to produce an output suitable for defining the rendering of a three dimensional image with a display of the closed caption text at the perceived z-axis position defined by the closed caption disparity data.

2. A method of decoding closed caption disparity data, comprising:

at a television receiver device, receiving the closed caption disparity data encoded as a sequence of one or more frame interval and slope change pairs, each frame interval and slope change pair including a frame interval value, which represents a designated number of frames that occur prior to application of the slope change paired with the respective frame interval, and a slope change value, which indicates a change in slope from the slope set by a preceding frame interval and slope change pair;

where the sequence of one or more frame interval and slope change pairs further includes an initial frame interval and slope change pair that precedes the one or more frame interval and slope change pairs, the initial frame interval and slope change pair including a slope change value which indicates a change in slope to be applied to a predetermined slope;

receiving a sequence of caption data packets, where the sequence of caption data packets specify closed caption text; and where the closed caption disparity data is used to determine a horizontal offset of left and right eye views of the closed caption text that establishes a perceived z-axis position of the closed caption text corresponding to each frame.

3. The method according to claim 2, where the predetermined slope is zero.

4. The method according to claim 2, where the slope change is signaled as a value in the range −16 to +15 that indicates the amount of change in slope to apply after the designated frame interval.

5. The method according to claim 2, further comprising receiving an alternate fixed disparity value that establishes a fixed perceived z-axis position for the closed caption text packaged along with the encoded closed caption disparity data for use as an alternative z-axis position.

6. The method according to claim 2, further comprising low pass filtering the encoded closed caption disparity data to smooth transitions in the disparity values.

7. The method according to claim 2, further comprising processing the closed caption text and the closed caption disparity data to produce an output suitable for defining a rendering of a three-dimensional image with a display of the closed caption text at the perceived z-axis position defined by the closed caption disparity data.

8. The method according to claim 2, where the slope change is given as a value representing a change in disparity over $2^N$ frames where N is an integer.

9. The method according to claim 8, where N=5.

10. A non-transitory computer readable storage medium storing instructions that when executed on one or more programmed processors carry out a process of decoding closed caption disparity data, comprising:

receiving the closed caption disparity data encoded as a sequence of one or more frame interval and slope change pairs, each frame interval and slope change pair including a frame interval value, which represents a designated number of frames that occur prior to application of the slope change paired with the respective frame interval, and a slope change value, which indicates a change in slope from the slope set by a preceding frame interval and slope change pair;

where the sequence of one or more frame interval and slope change pairs further includes an initial frame interval and slope change pair that precedes the one or more frame interval and slope change pairs, the initial frame interval and slope change pair including a slope change value which indicates a change in slope to be applied to a predetermined slope;

receiving a sequence of caption data packets, where the sequence of caption data packets specify closed caption text; and where the closed caption disparity data is used to determine a horizontal offset of left and right eye views of the closed caption text that establishes the perceived z-axis position of the closed caption text, to be displayed in the closed caption display region, corresponding to each frame.

11. A television receiver device that processes disparity data for closed captions, comprising:

circuitry configured to:

receive the closed caption disparity data encoded as a sequence of one or more frame interval and slope change pairs, each frame interval and slope change pair including a frame interval value, which represents a designated number of frames that occur prior to application of the slope change paired with the respective frame interval, and a slope change value, which indicates a change in slope from the slope set by a preceding frame interval and slope change pair;

where the sequence of one or more frame interval and slope change pairs further includes an initial frame interval and slope change pair that precedes the one or more frame interval and slope change pairs, the initial frame interval and slope change pair including a slope change value which indicates a change in slope to be applied to a predetermined slope;

parse the encoded closed caption disparity data and closed caption text from one or more signals; and generate, based on the encoded closed caption disparity data and the closed caption text, a sequence of video frame signals including the closed caption text displayed at a perceived z-axis position in each frame.

12. The device according to claim 11, where the predetermined slope is zero.

13. The device according to claim 11, where the frame interval is given as a predetermined value of $2^N$ frames, where N is an integer.

14. The device according to claim 11, where the slope change is signaled as a value in the range −16 to +15 that indicates the amount of change in slope to apply after the designated frame interval.

15. The device according to claim 11, where the circuitry is further configured to receive an alternate fixed disparity value that establishes a fixed z-axis position for a portion of the closed caption text packaged along with the encoded closed caption disparity data for use as an alternative perceived z-axis position.

16. The device according to claim 11, further comprising a low-pass filter that processes the encoded closed caption disparity data to smooth transitions in the disparity values.

17. The device according to claim 11, where the circuitry is further configured to process the closed caption text and the encoded closed caption disparity data to produce an output suitable for defining a rendering of a three-dimensional image with a display of the closed caption text at the perceived z-axis position defined by the encoded closed caption disparity data.

18. The device according to claim 11, where the slope change is given as a value representing a change in disparity over 32 frames.

19. The device according to claim 18, where the slope change is signaled as a value in the range −16 to +15 that indicates the amount of change in slope to apply after the designated frame interval.

20. A method of decoding closed caption disparity data, comprising:
at a television receiver device, receiving encoded dynamic closed caption disparity data that determines a perceived z-axis position for a closed caption display region that changes frame by frame for a sequence of video frames;
at the television receiver device, receiving an encoded alternate closed caption disparity value that sets the perceived z-axis position for the closed caption display region that is static for the sequence of video frames;
receiving a sequence of caption data packets, where the sequence of caption data packets specify closed caption text to be displayed in the closed caption display region;
where one of the encoded dynamic closed caption disparity data and the alternate disparity value is used for the sequence of video frames to determine a horizontal offset of left and right eye views of the closed caption display region that establishes the perceived z-axis position of the closed caption display region corresponding to each frame; where the encoded dynamic closed caption disparity data is encoded as a sequence of one or more frame interval and slope change pairs, each frame interval and slope change pair including a frame interval value, which represents a designated number of frames that occur prior to application of the slope change paired with the respective frame interval, and a slope change value, which indicates a change in slope from the slope set by a preceding frame interval and slope change pair; and
where the sequence of one or more frame interval and slope change pairs further includes an initial frame interval and slope change pair that precedes the one or more frame interval and slope change pairs, the initial frame interval and slope change pair including a slope change value which indicates a change in slope to be applied to a predetermined slope.

21. The method according to claim 20, where the predetermined slope is zero.

22. The method according to claim 20, further comprising low pass filtering the encoded dynamic closed caption disparity data to smooth transitions in disparity values.

23. The method according to claim 20, further comprising processing the closed caption text and the encoded dynamic closed caption disparity data to produce an output suitable for defining a rendering of a three-dimensional image with a display of the closed caption text at the perceived z-axis position defined by the encoded dynamic closed caption disparity data.

24. A non-transitory computer readable storage device medium storing instructions that when executed on one or more programmed processors carry out a process of decoding closed caption disparity data, comprising
receiving encoded dynamic closed caption disparity data that determines a perceived z-axis position for a closed caption display region that changes frame by frame for a sequence of video frames;
at the television receiver device, receiving an encoded alternate closed caption disparity value that sets the perceived z-axis position for the closed caption display region that is static for the sequence of video frames;
receiving a sequence of caption data packets, where the sequence of caption data packets specify closed caption text to be displayed in the closed caption display region;
where one of the encoded dynamic closed caption disparity data and the alternate disparity value is used for the sequence of video frames to determine a horizontal offset of left and right eye views of the closed caption display region that establishes the perceived z-axis position of the closed caption display region corresponding to each frame; where the encoded dynamic closed caption disparity data is encoded as a sequence of one or more frame interval and slope change pairs, each frame interval and slope change pair including a frame interval value, which represents a designated number of frames that occur prior to application of the slope change paired with the respective frame interval, and a slope change value, which indicates a change in slope from the slope set by a preceding frame interval and slope change pair; and
where the sequence of one or more frame interval and slope change pairs further includes an initial frame interval and slope change pair that precedes the one or more frame interval and slope change pairs, the initial frame interval and slope change pair including a slope change value which indicates a change in slope to be applied to a predetermined slope.

* * * * *